INVENTORS.
ALEXANDER HING MARK
JOSEPH NECAS
JERZY M. BRZUSTOWSKI
BY
ATTORNEYS.

Jan. 10, 1967  A. H. MARK ET AL  3,296,782
THRESHING AND SEPARATING MECHANISM
Filed Feb. 4, 1964  7 Sheets-Sheet 6

INVENTORS.
ALEXANDER HING MARK
JOSEPH NECAS
JERZY M. BRZUSTOWSKI
BY
ATTORNEYS

INVENTORS.
ALEXANDER HING MARK
JOSEPH NECAS &
JERZY M. BRZUSTOWSKI
BY Wolfe, Hubbard, Voit & Osann
ATTORNEYS.

United States Patent Office 3,296,782
Patented Jan. 10, 1967

3,296,782
THRESHING AND SEPARATING MECHANISM
Alexander Hing Mark, Livonia, Mich., and Joseph Necas and Jerzy M. Brzustowski, Toronto, Ontario, Canada, assignors to Massey-Ferguson Limited, Toronto, Ontario, Canada
Filed Feb. 4, 1964, Ser. No. 343,192
11 Claims. (Cl. 56—21)

This application is a continuation-in-part of our application Serial No. 205,247, filed June 26, 1962, now abandoned.

This invention relates generally to agricultural combines and concerns, more particularly, a threshing and separating assembly for such combines.

The functions of grain threshing and of separating the grain from the straw, chaff and trash in a conventional modern combine are performed by separate mechanisms. The harvested grain is first conveyed to a threshing cylinder which drives the grain over an adjacent semicylindrical concave. Most of the grain and chaff is separated and fed directly to the grain cleaning mechanism, but an appreciable amount of grain is entrapped in the straw. To recover the grain from the straw, the threshed mass of straw is deposited on oscillating straw walkers that jog the straw and trash reardwardly and out of the combine while allowing the grain to fall free and separate from the remainder of the mass. This additional grain is then directed to the combine cleaning mechanism.

A straw walker type of separating mechanism is bulky and heavy as well as adding to the complexity and power demands of the combine. Moreover, the straw walkers usually impose a capacity limit on combine performance and restrict the crops that can be efficiently handled.

The invention lies in a grain separating and threshing assembly that includes an elongated cylinder journaled transversely in a combine which cooperates with a concave and grate assembly fitted about the cylinder so that harvested material fed to the center portion of the cylinder from the combine header is driven axially of the cylinder in a generally helical path to a side of the combine, with there being a grain collection arrangement for carrying grain passed through the concave and grate assembly to the combine grain cleaning mechanism, and a straw discharging device at the side of the combine toward which the harvested material is driven.

An example of the inventive threshing and separating mechanism is shown in the accompanying drawings, in which.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
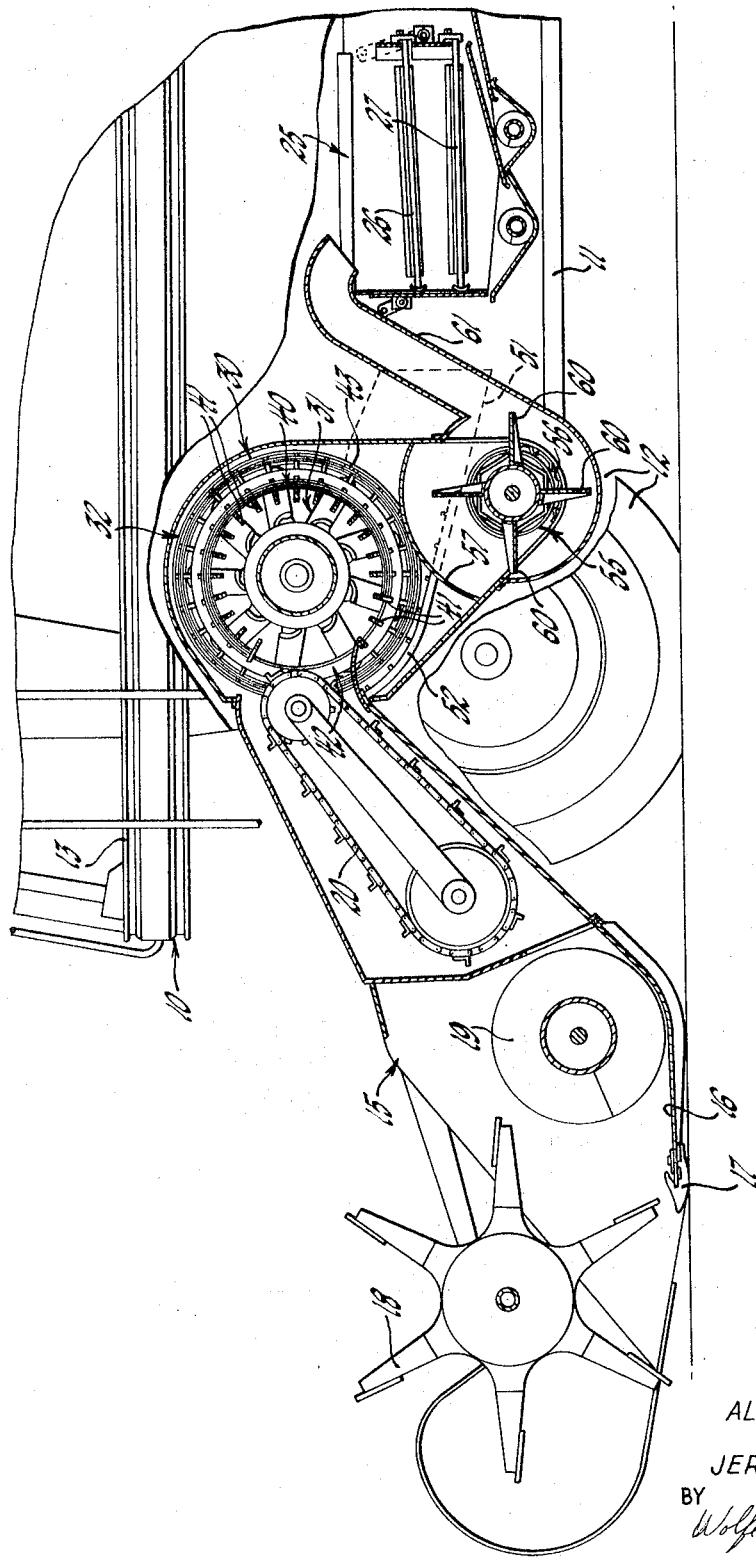
FIGURE 1 is a fragmentary elevation, partially in section, of a combine embodying the present invention.
Figure 2:
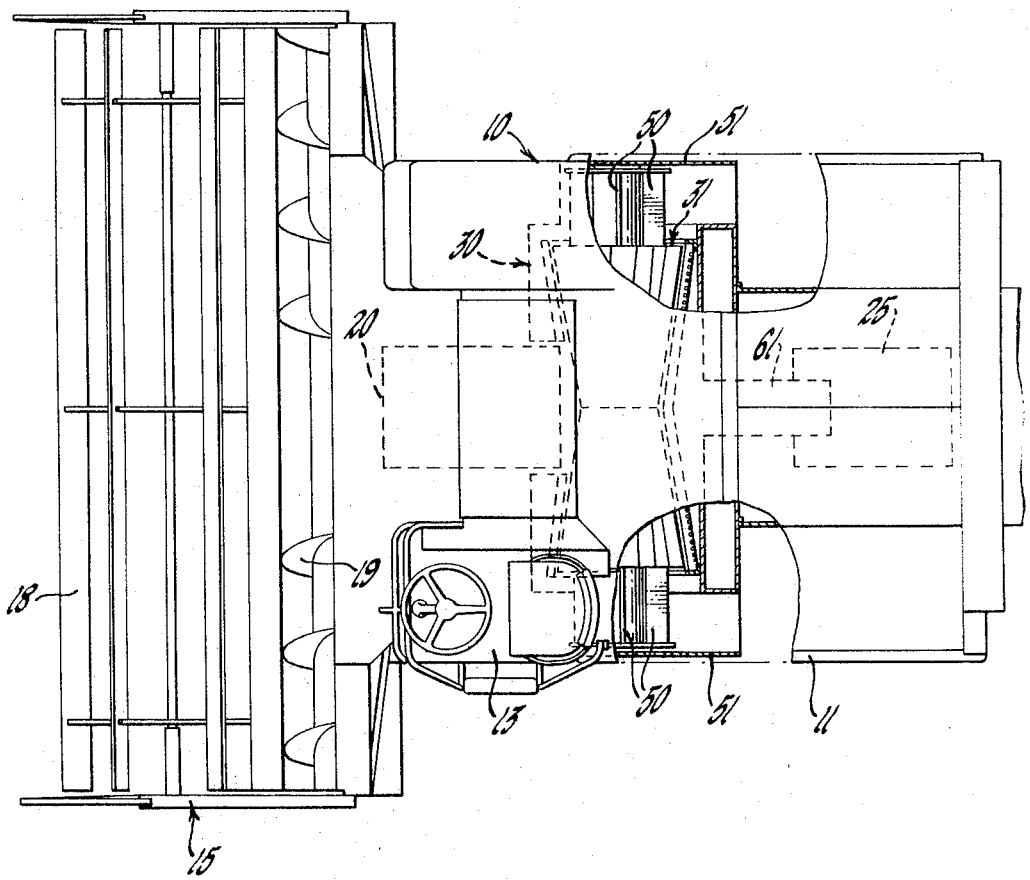
FIG. 2 is a somewhat reduced, fragmentary plan of the combine portion shown in FIG. 1.

Turning first to FIGS. 1 and 2, there is fragmentarily shown a combine 10 of the self-propelled type which embodies the invention and includes a body or frame 11 supported on front drive wheels 12 and carrying a forwardly disposed operator's platform 13.

For harvesting and gathering the crop material, a header 15 is mounted on the frame 11 transversely at the forward end of the combine. The header 15 includes a table 16 having a cutter bar assembly 17 at the forward edge disposed beneath a reel 18. A gathering auger 19 receives the material cut by the cutter bar 17 and carries it toward the central portion of the header where it is received and conveyed rearwardly and upwardly by an elevator 20.

To clean the grain once it has been threshed and separated from the straw and trash, a cleaning mechanism 25 is disposed rearwardly of the header 15 in the frame 11 of the combine. The mechanism 25 takes the form of a shaker shoe assembly that includes upper and lower screens or sieves 26 and 27 over which the grain is passed. A winnowing fan, not shown, directs an upwardly inclined blast of air through the screens 26, 27 so as to carry off chaff and clean the grain as it is vibrated rearwardly of the assembly 25.

Pursuant to the invention, a threshing and separating assembly 30 is disposed in the frame 11 between the header 15 and the cleaning mechanism 25. The assembly 30 includes a threshing cylinder 31 journaled transversely of the combine and a concave and grate assembly 32 that is closely fitted about the cylinder. The cylinder 31 and the concave and grate assembly 32 are symmetrically conical in configuration, with the narrowest portions being at the center of the combine frame and the widest portions of the symmetrical halves being at either side of the combine.

The cylinder 31 includes a shaft assembly 33 carrying a plurality of hubs 34 on which are mounted spaced, axially oriented peripheral rasp bars 35 formed with helically disposed grooves 36. The cylinder 36 is driven through a shaft extension 37 (see FIG. 4) from the main pofer plant (not shown) of the combine.

Figure 3:
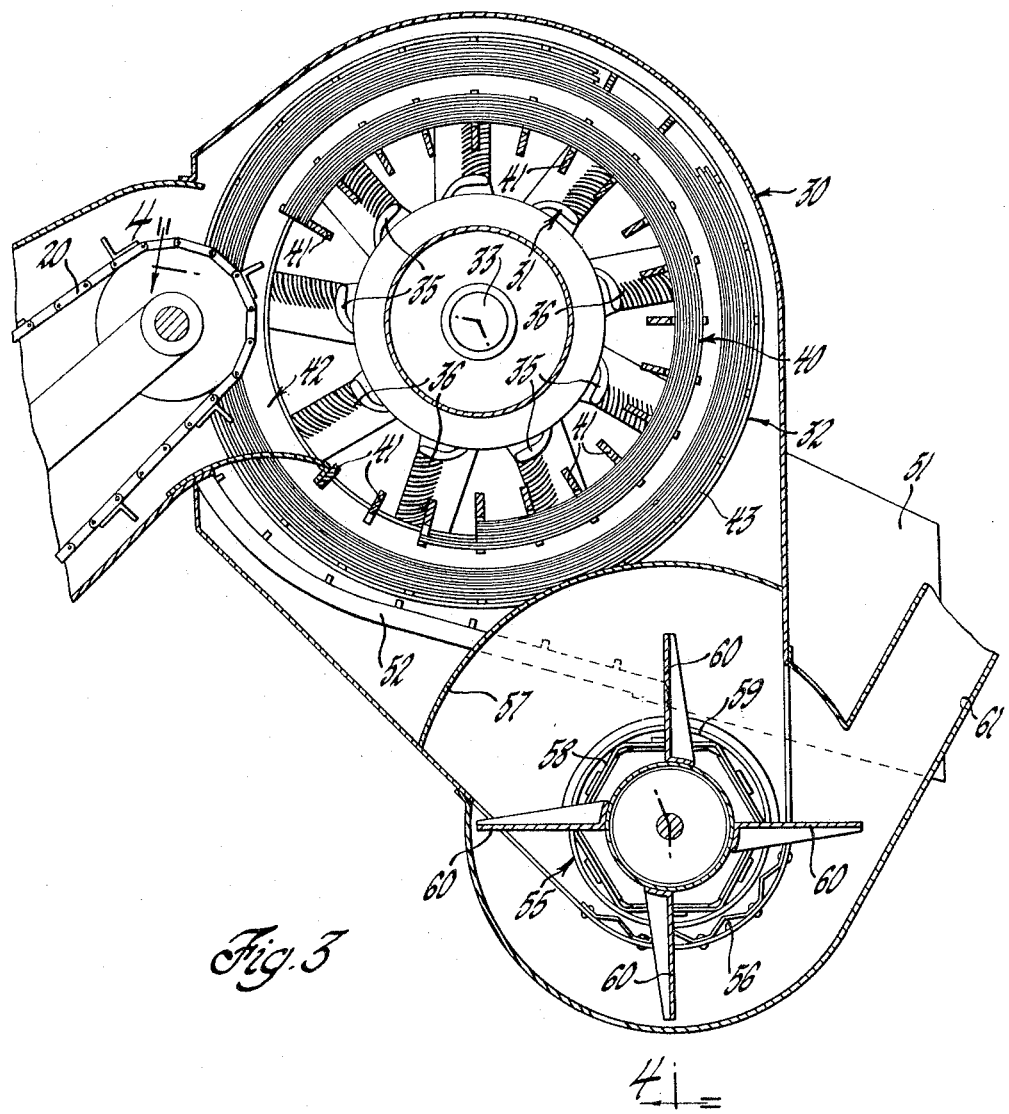
FIG. 3 is an enlarged section showing a portion of the threshing and separating assembly appearing in FIG. 1 and has been taken approximately along the line 3—3 in FIG. 4.

The concave and grate assembly 32 includes a fixed, axially ribbed concave 40 having ribs 41 extending more than 180° about the concave periphery but leaving a peripheral opening 42 through which harvested material can be fed from the header elevator 20 to the threshing cylinder 31. See particularly FIGS. 3 and 4.

Figure 4:
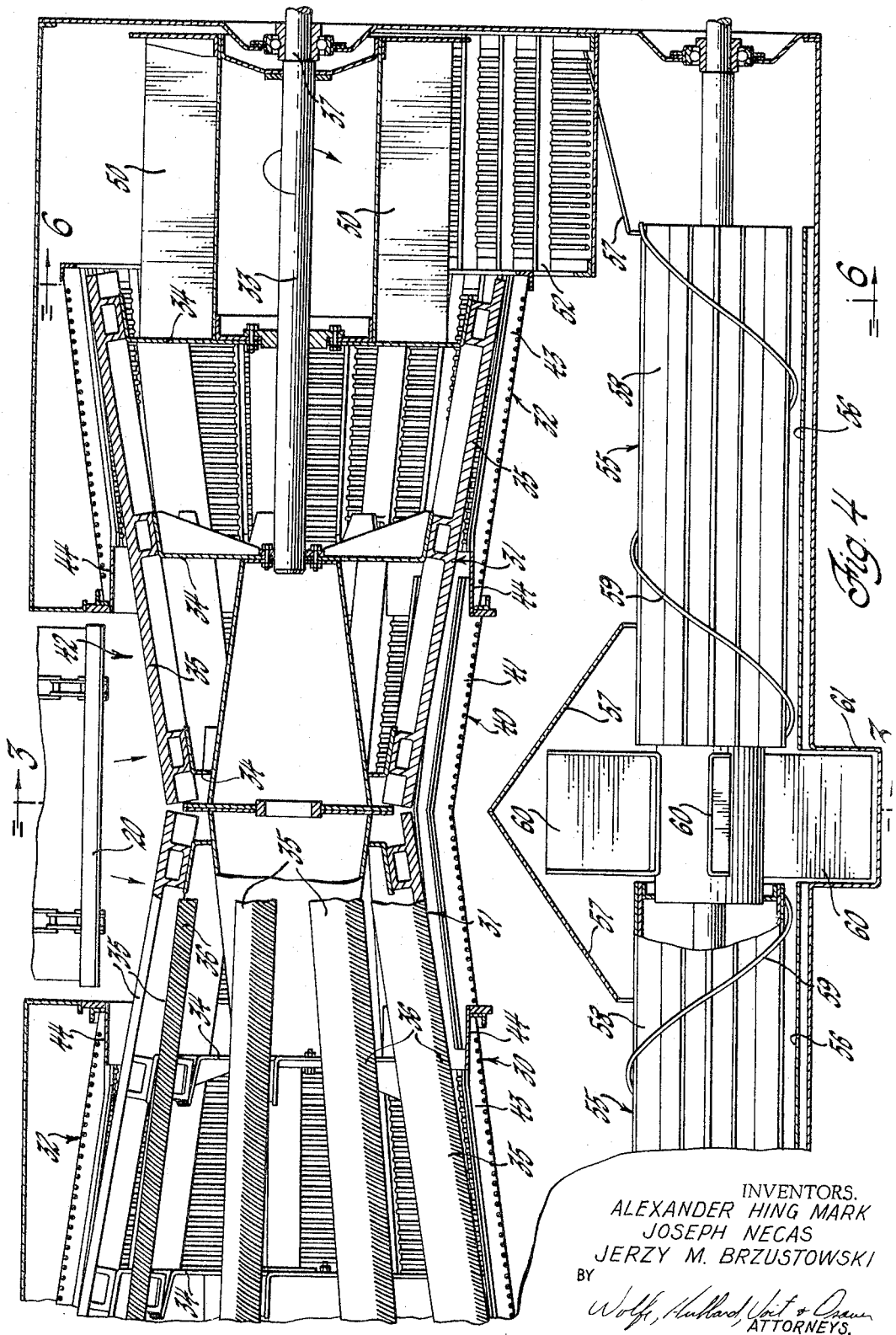
FIG. 4 is a developed section taken approximately along the line 4—4 in FIG. 3.
Figure 5:
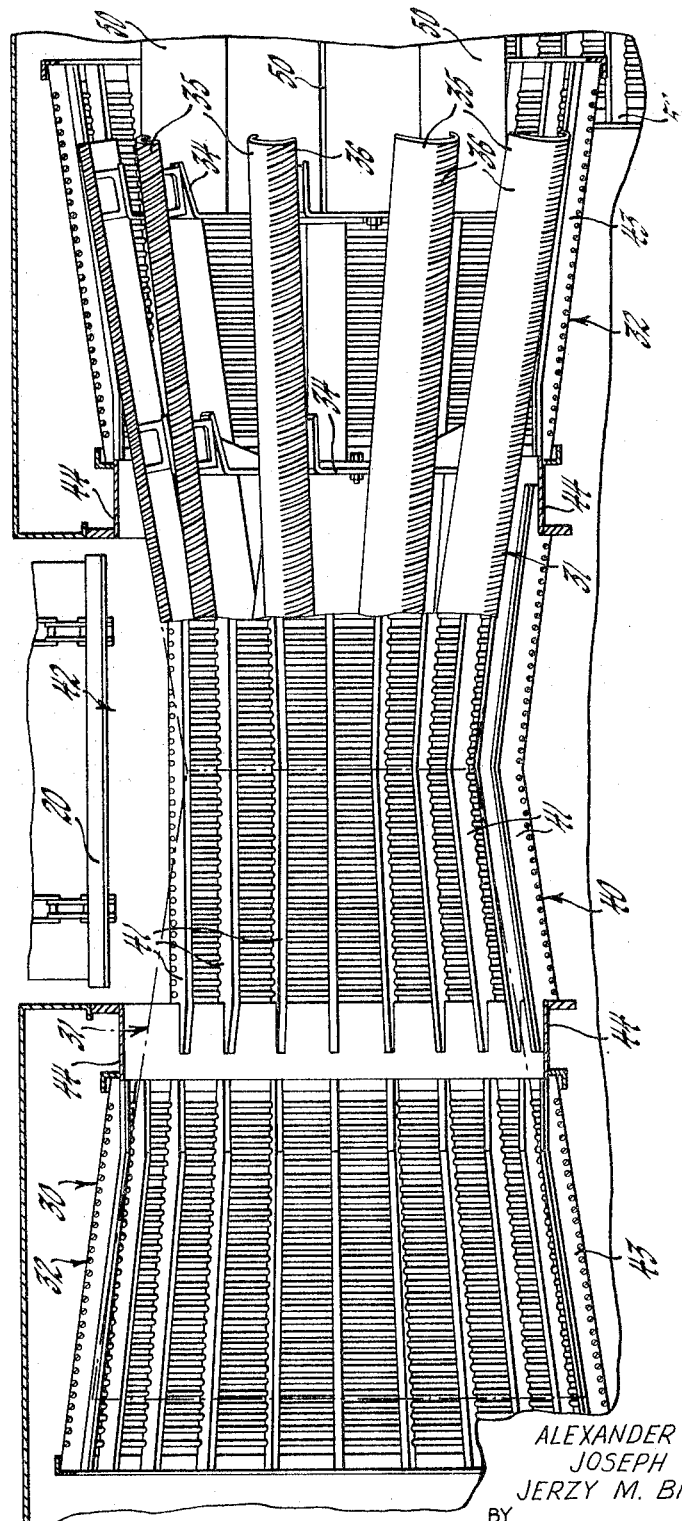
FIG. 5 is a fragmentary section corresponding to FIG. 4 but with parts shown in alternate positions of adjustment.
Figure 6:
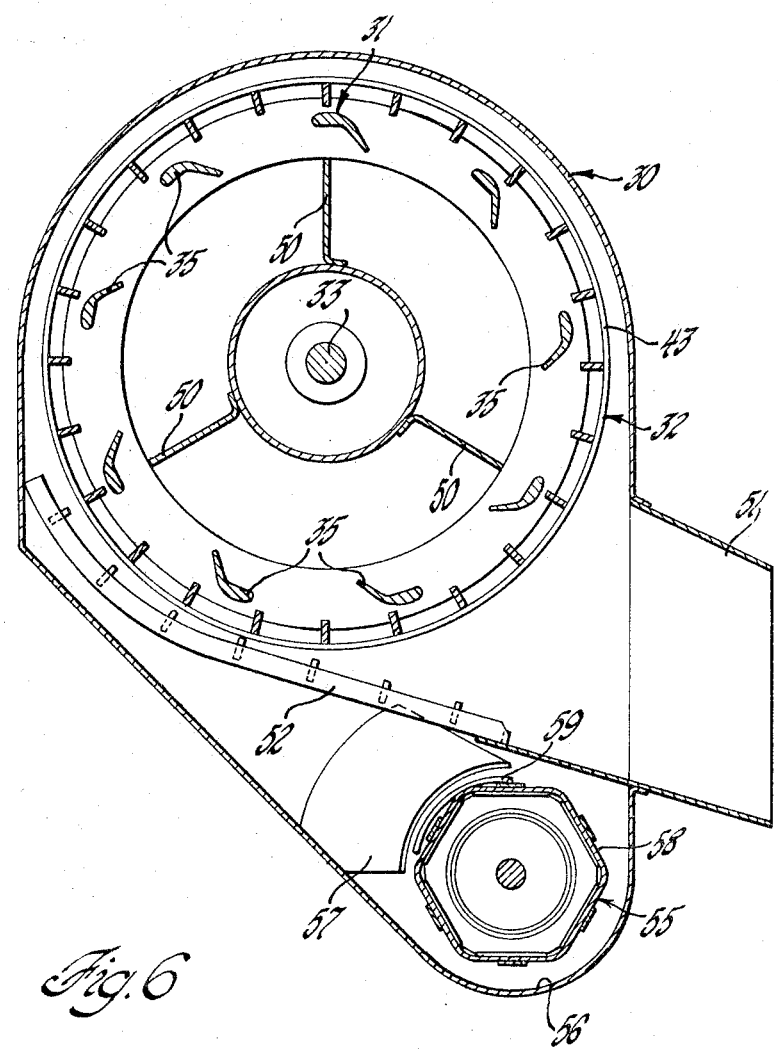
FIG. 6 is a section taken approximately along the line 6—6 in FIG. 4.

The assembly 32 also includes a pair of conical grates 43 which are arranged coaxially of the cylinder 31 at each end of the fixed concave 40. The grates 43 are axially adjustable on cylindrical collars 44 so as to permit selection of the spacing between the inner surfaces of the conical grates 43 and the outer surfaces of the cylinder rasp bars 35. In FIG. 4 the grates 43 are illustrated in their inwardmost positions so that a maximum amount of spacing between the grates and the periphery of the cylinder 31 is provided. In FIG. 5 the grates have been shown slid outwardly on the collars 44 so as to minimize the spacing between the grates and the rasp bars 35 of the threshing cylinder.

The effect of the helical grooves 36 in the cylinder rasp bars 35, and of the conical configuration of the cylinder 31 and the concave and grate assembly 32, is to drive harvested material axially of the threshing cylinder in a generally helical path from the center portion of the combine, where threshing material is received by the cylinder 31 through the opening 42, toward each side of the combine. The mass of harvested material makes several revolutions as it proceeds in a helical path toward either side of the combine so that the material is both threshed and separated for a considerable period of time. The grain passes through the concave 40 and the grates 43 while the straw and trash is moved axilly from each end of the cylinder 31.

Figure 8:
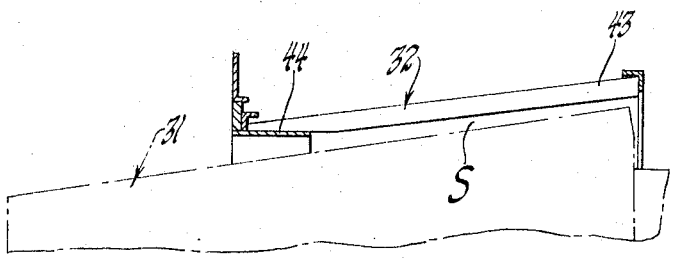
FIG. 8 is a fragmentary simplified section showing a portion of the structure appearing in FIG. 4.

Preferably, the conical cylinder 31 is formed with a slightly greater taper than the conical concave and grate assembly 32 so that the intermediate space S (see FIG. 8) converges toward the ends of the grates 43. That is, the clearance between the cylinder and the concave and the grates reduces to a minimum at the widest portions of the cylinder and grate assembly, i.e., at the right in FIG. 8.

This convergence of the space S tends to maintain a more uniform cross sectional area through which the crop material flows since the increasing diameter of the crop flow path represented by the space S is offset by the convergence of the space. Moreover, it is desirable to provide slightly more convergence than is required to compensate for the increasing diameter of the space S so that the cross sectional area of the crop flow path decreases toward the ends of the cylinder 31.

A decreasing cross sectional area is desirable since the velocity of the crop material increases as the diameter of its flow path increases and the reduced cross sectional area tends to maintain a more uniform density of crop material throughout the length of the cylinder. A uniform density insures more uniform threshing and separating. Also, there is a slight reduction in the mass of the crop material as grain is separated and a decreasing cross sectional area of the flow path is desirable to compensate and maintain uniform density of the material in the space S.

To discharge the straw, radially disposed elements 50 are mounted on each end of the threshing cylinder 31 so as to throw the straw peripherally of the cylinder through discharge chutes 51 provided on each side of the combine. The chutes 51 direct the straw down and back relative to the combine frame 11 and are provided with bottom grills 52 against which the straw is first thrown by the elements 50. The elements 50, being vane-like, not only physically throw the straw material but develop an air blast which, together with the impetus with which straw is thrown against the grills 52, provides a final grain separation effect before the straw is discharged from the combine.

Figure 7:
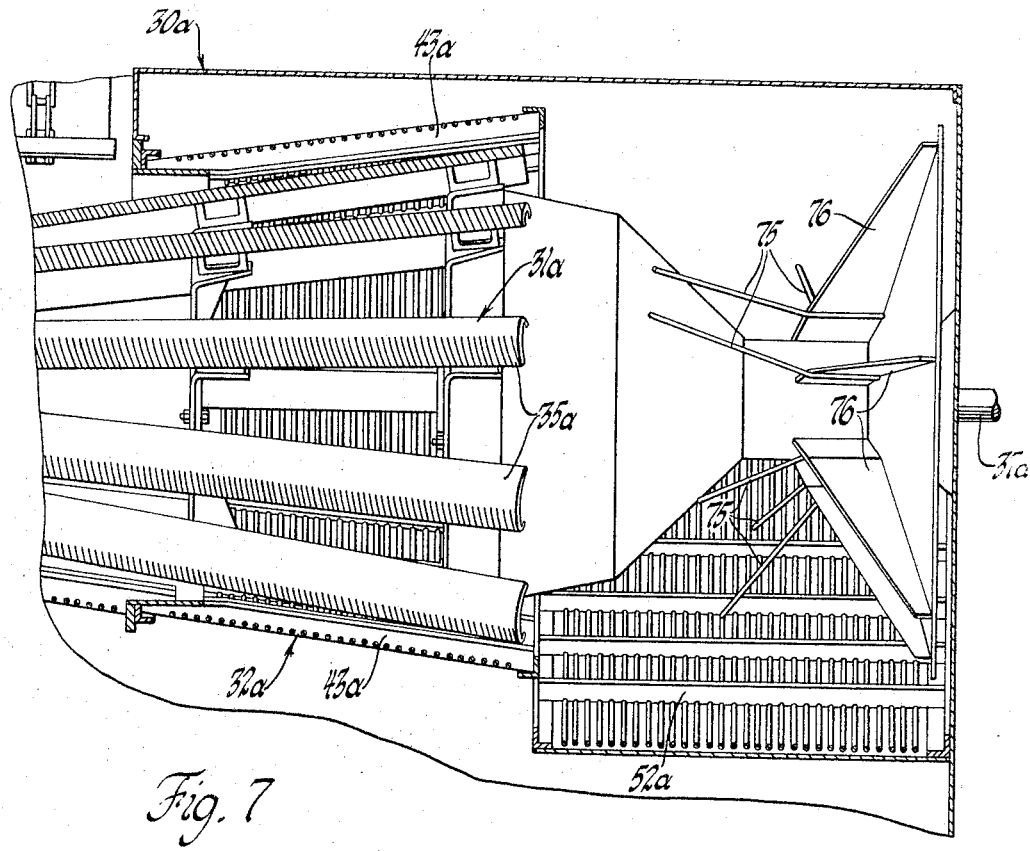
FIG. 7 is a fragmentary section corresponding to a portion of FIG. 4 and showing an alternate construction.

An alternate straw discharging arrangement is shown in FIG. 7 in which parts corresponding to those already described have been given the same reference numerals with the distinguishing suffix "a" added. In this embodiment, straw and trash emerging between the cylinder 31a and the grate 43a is acted upon by a plurality of rod-like, radially disposed elements 75 mounted on the cylinder 31a. The elements 75 throw the straw peripherally of the cylinder, and from the combine, over a grill 52a. Preferably, the elements 75 are mounted on vanes 76 positioned on the extreme end of the cylinder. In this arrangement the elements 75 physically throw the straw onto and over the grill 52a and the vanes 76 develop an air blast to assist in the final grain separation effect and the clearing of the straw and trash from the combine.

To collect the separated grain, an auger 55 is disposed in a trough 56 extending transversely of the combine beneath the concave and grate assembly 32. A plurality of deflector plates 57 serve to direct the grain falling through the concave 40, the grates 43, and the grills 52, toward the auger 55. The auger 55 is formed by a pair of hexagonal tubes 58 about which are helically wound wires 59 so that rotation of the auger causes the wires 59 to urge the grain in the trough 56 toward the center region of the combine where a plurality of slinger elements 60 impel the grain up and back through a chute 61 onto the cleaning mechanism 25.

It can thus be seen that the compact threshing and separating assembly 30 performs both the threshing and separating functions in the combine 10. This greatly simplifies the combine structure by eliminating the conventional straw walkers and utilizing a single rotating element, the threshing cylinder 31, for both threshing and separating. Since the harvested material moves in a helical path from the center of the assembly 30 toward either end, it is subject to considerable threshing and separating action so that the grain is threshed and separated quite efficiently. The compact nature of the design permits an overall reduction in combine size without loss of capacity.

The embodiments of the invention in which an exclusive property or privilege is claimed are defined as follows.

What is claimed is:

1. A combine including a grain harvesting and gathering header disposed transversely at the forward end of the combine and a grain cleaning mechanism disposed rearwardly of the header, characterized by having an elongated threshing and separating cylinder assembly journaled transversely of the combine between said header and said cleaning mechanism, a concave and grate assembly fitted about said cylinder assembly and having a peripheral opening allowing harvested material to be fed from said header to the center portion of said cylinder, means for rotating said cylinder assembly to drive harvested material axially of the cylinder assembly in a generally helical path toward one side of the combine, means for carrying grain passing through said concave and grate assembly to said cleaning mechanism, and means for discharging straw from the end of said cylinder assembly adjacent said side of the combine.

2. The combination of claim 1 in which said cylinder assembly is formed with spaced, axially oriented, peripheral rasp bars with helically disposed grooves for urging grain axially toward said combine side, and said straw discharging means includes elements mounted on the end of said cylinder so as to throw the straw peripherally from the end of the cylinder assembly at said side of the combine.

3. The combination of claim 1 in which said cylinder assembly and said concave and grate assembly are conical in configuration with the widest portions being at said side of the combine, and said concave and grate assembly includes an axially movable portion to permit selection of the spacing between said portion and said cylinder assembly.

4. The combination of claim 3 in which said conical cylinder assembly has a greater taper than said conical concave and grate assembly so that the spacing between the two is reduced at said widest portions.

5. In a combine having a frame, a grain separating and threshing assembly comprising, in combination, an axially ribbed concave fixed on said frame and having an inner generally annular end portion with a peripheral opening giving access to said inner portion, a conical grate arranged on said frame coaxially with said concave and having an inner conical portion constituting an extension of said concave end portion, a threshing cylinder assembly journaled in said frame coaxially with said concave and said grate, said cylinder having a periphery correspondingly shaped and fitted within said concave end portion and said grate, means for discharging straw at the end of said grate, and means for collecting grain passed radially through said concave and said grate for cleaning.

6. In the combination of claim 5, said end portion being conical and having axially disposed ribs extending more than 180° about the periphery of said concave.

7. In the combination of claim 5, said grate being axially adjustable on said frame so as to permit selection of the spacing between said grate and said cylinder.

8. In the combination of claim 5, said cylinder including spaced, axially oriented, peripheral rasp bars with helically disposed grooves.

9. In the combination of claim 5, said straw discharging means including elements mounted on the end of said cylinder so as to throw the straw peripherally from the ends of said grate and cylinder.

10. In the combination of claim 5, said means for collecting grain including an auger disposed in a trough beneath and generally parallel with said cylinder, said auger carrying slinger elements for receiving grain moved by the auger and impelling the grain up and back in said combine for cleaning.

11. In the combination of claim 5, said cylinder assembly having a greater taper than said grate so that the spacing between the two converges toward the end of the grate.

References Cited by the Examiner

UNITED STATES PATENTS 2,705,961  4/1955  Worrell et al. _____ 130—27
2,749,696  6/1956  Innes _____ 56—21
2,999,347  9/1961  Horne et al. _____ 56—21

FOREIGN PATENTS 421,031  5/1947  Italy.

ABRAHAM G. STONE, *Primary Examiner.*

ANTONIO F. GUIDA, *Examiner.*